United States Patent [19]
Calmettes

[11] Patent Number: 5,704,098
[45] Date of Patent: Jan. 6, 1998

[54] CLAMPING COLLAR FOR TUBULAR PART

[76] Inventor: Lionel Calmettes, 4, Rue des Palombes, 11430 Gruissan, France

[21] Appl. No.: 693,131
[22] PCT Filed: Dec. 14, 1995
[86] PCT No.: PCT/FR95/01668
  § 371 Date: Aug. 13, 1996
  § 102(e) Date: Aug. 13, 1996
[87] PCT Pub. No.: WO96/18841
  PCT Pub. Date: Jun. 20, 1996

[30] Foreign Application Priority Data

Dec. 14, 1994 [FR] France ................... 94 15048
Sep. 20, 1995 [FR] France ................... 95 11019

[51] Int. Cl.[6] ............................................. B65D 63/00
[52] U.S. Cl. ......................... 24/19; 24/20 TT; 24/271
[58] Field of Search .................. 24/19, 20 R, 20 CW, 24/20 TT, 269, 270, 271, 272, 483

[56] References Cited

U.S. PATENT DOCUMENTS

| 287,755 | 10/1883 | Bradford | 24/19 |
|---|---|---|---|
| 2,390,232 | 12/1945 | Venditty | 24/271 |
| 2,546,098 | 3/1951 | Houghton et al. | 24/271 |
| 3,981,049 | 9/1976 | Oetiker . | |
| 4,480,359 | 11/1984 | Koster | 24/271 |
| 5,327,618 | 7/1994 | Chene et al. | 24/19 |

FOREIGN PATENT DOCUMENTS

| 0084443 | 12/1964 | France | 24/271 |
|---|---|---|---|
| 0646219 | 9/1962 | Italy | 24/20 TT |
| 0575469 | 2/1946 | United Kingdom | 24/270 |
| 2150970 | 7/1985 | United Kingdom | 24/19 |
| 2 241 280 | 8/1991 | United Kingdom . | |

*Primary Examiner*—Victor N. Sakran
*Attorney, Agent, or Firm*—Young & Thompson

[57] ABSTRACT

A clamping collar includes a tightener connected to two ends of a band which has its ends positioned on an arcuate screen. Clamping is achieved symmetrically with respect to a diametrical plane of the collar so that the portions of the collar which lie in the diametrical plane do not move relative to the part to be clamped.

23 Claims, 6 Drawing Sheets

CLAMPING COLLAR FOR TUBULAR PART

The invention relates to a clamping collar for a tubular part.

Clamping collars are increasingly frequently designed to ensure symmetrical clamping. To this end, they comprise a belt of length substantially close to the perimeter of the tube to be clamped, and an arcuate screen on which the two ends of the belt are slid.

Advantageously, the arcuate screen comprises two racks which are symmetrical to one another, and the end parts of the belt each comprise a tooth or tab susceptible of engaging in the corresponding rack to block the collar in a clamped position. These collars are tightened by drawing the two ends of the belt towards one another over the arcuate screen. The tightening of these collars can only be adjusted by one pitch of the rack. It ensues that if the ideal tightening corresponds to a half pitch of the rack, the tube to be clamped is either insufficiently tightened or overtightened.

One aim of the invention is to provide a clamping collar for a tubular part, providing an ideal tightening corresponding to the tube to be clamped.

The object of the invention is to provide a clamping collar for a tubular part, comprising an arcuate screen, a belt and a tightening means, characterized in that:

the arcuate screen is symmetrical in relation to a diametral plane of the collar, the belt is symmetrical in relation to said diametral plane of the collar, and its ends are positioned on the arcuate screen, the tightening means is substantially symmetrical in relation to said diametral plane of the collar and is connected to the two ends of the belt, and the tightening is performed symmetrically in relation to said diametral plane of the collar, by drawing the two ends of the belt closer to one another by way of the action of the tightening means, so that the points of the arcuate screen and belt situated in said diametral plane of the collar do not have any relative motion in relation to the part to be clamped.

According to further features of the invention:

the tightening means is a helicoid spring, preferably with contiguous convolutions, ending in two arms each engaging in one end of the belt;

the belt is an open loop and comprises a catching means at both its ends for the tightening means;

the catching means on the belt is comprised of pleats in the belt;

the pleat in the belt comprises an outwardly folded-back part leaving room for the arm of the spring to pass;

the central portion of the pleat is cut laterally and raised to form a eyelet intended to receive the angled end of the spring arm;

in the vicinity of its ends, the belt comprises tabs folded towards the interior of the collar;

the arcuate screen comprises, in the vicinity of its ends, racks susceptible of engaging with the belt tabs;

the arcuate screen has upwardly folded lateral walls intended to guide the ends of the belt and to hold the spring;

the lateral walls of the arcuate screen comprise notches intended to make the arcuate screen flexible;

in the vicinity of the ends of the arcuate screen, the lateral walls comprise flaps folded parallel to the bottom of the arcuate screen and spaced apart from said bottom by a distance of approximately four times the thickness of the belt.

A further object of the invention is to provide a method for fitting the collar characterized in that it comprises the stages consisting in:

spreading apart the belt ends by acting on the tightening means so as to increase the diameter of the belt beyond the diameter of the tubular part to be clamped;

positioning the collar around the tubular part to be clamped, and releasing the action on the tightening means in order to let the tightening means bring the belt ends closer together to reduce the diameter of the belt below the diameter of the part to be clamped.

According to a feature of the invention, the different stages are carried out by means of a pliers type tool.

Another object of the invention is to provide a pliers for fitting and removing the collar, characterized in that it comprises a nose including a recess intended to receive the spring, and a nose bearing a finger intended to insert itself, when the pliers is closed, into the axial space of the spring to increase the diameter thereof, thus spreading apart the arms of the spring.

According to another feature of the invention, the nose including the recess comprises a right-hand wall constituting an abutment against which the spring rests when the pliers is closed, and a left-hand wall constituting an abutment that retains the spring when the pliers is opened.

According to another feature of the invention, the pliers comprises a finger intended to insert itself into the tightening means and to serve as a pivotal axis to two noses susceptible of spreading apart the two arms of the tightening means.

According to yet another feature of the invention, the pliers comprises two jaws each bearing a finger intended to insert itself into the tightening means and a nose comprising a slanted side intended to cooperate with one arm of the tightening means so that, upon closing the pliers, the two fingers provide axial support to the tightening means and the two slanted sides spread the two arms of the tightening means apart from one another.

Further features and advantages of the invention will be apparent from the embodiments of the invention described hereinunder in reference to the corresponding accompanying drawings in which.

Figure 3:
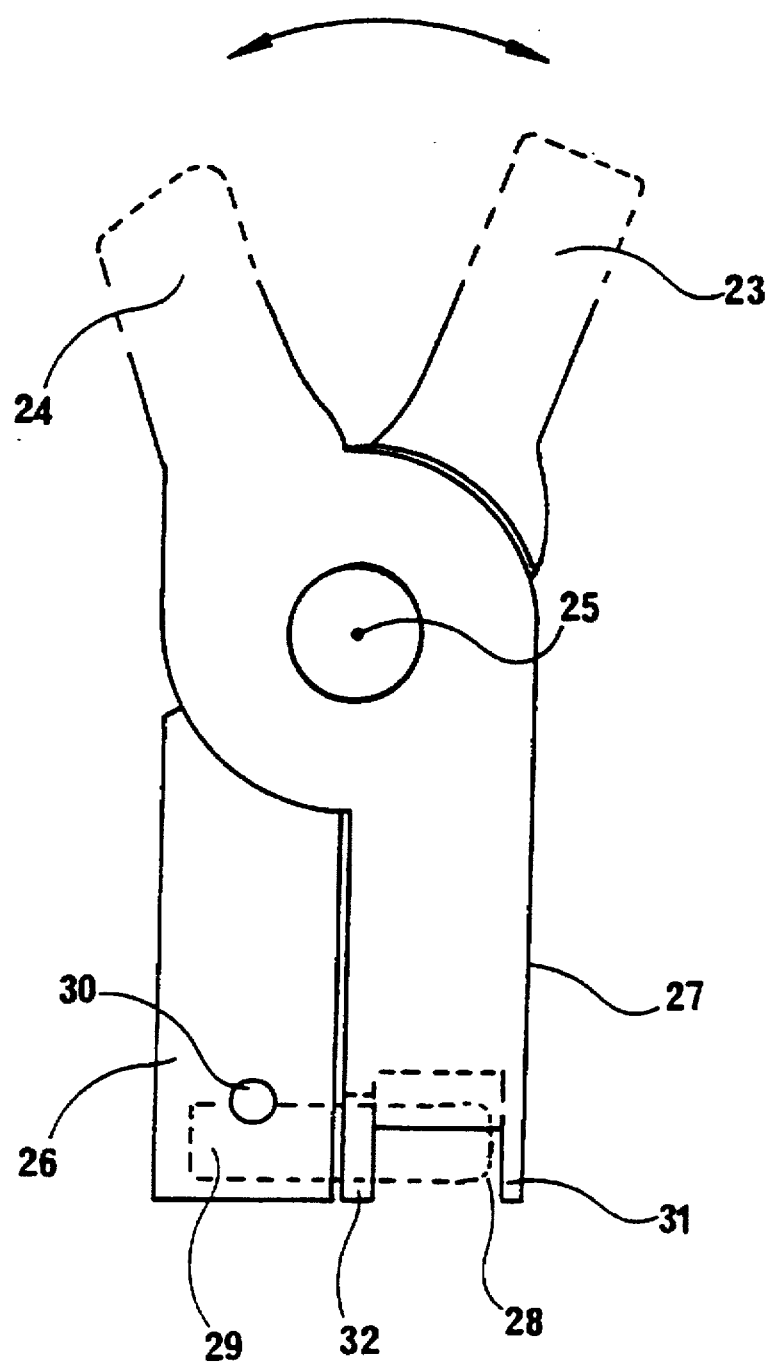
Figure 4:
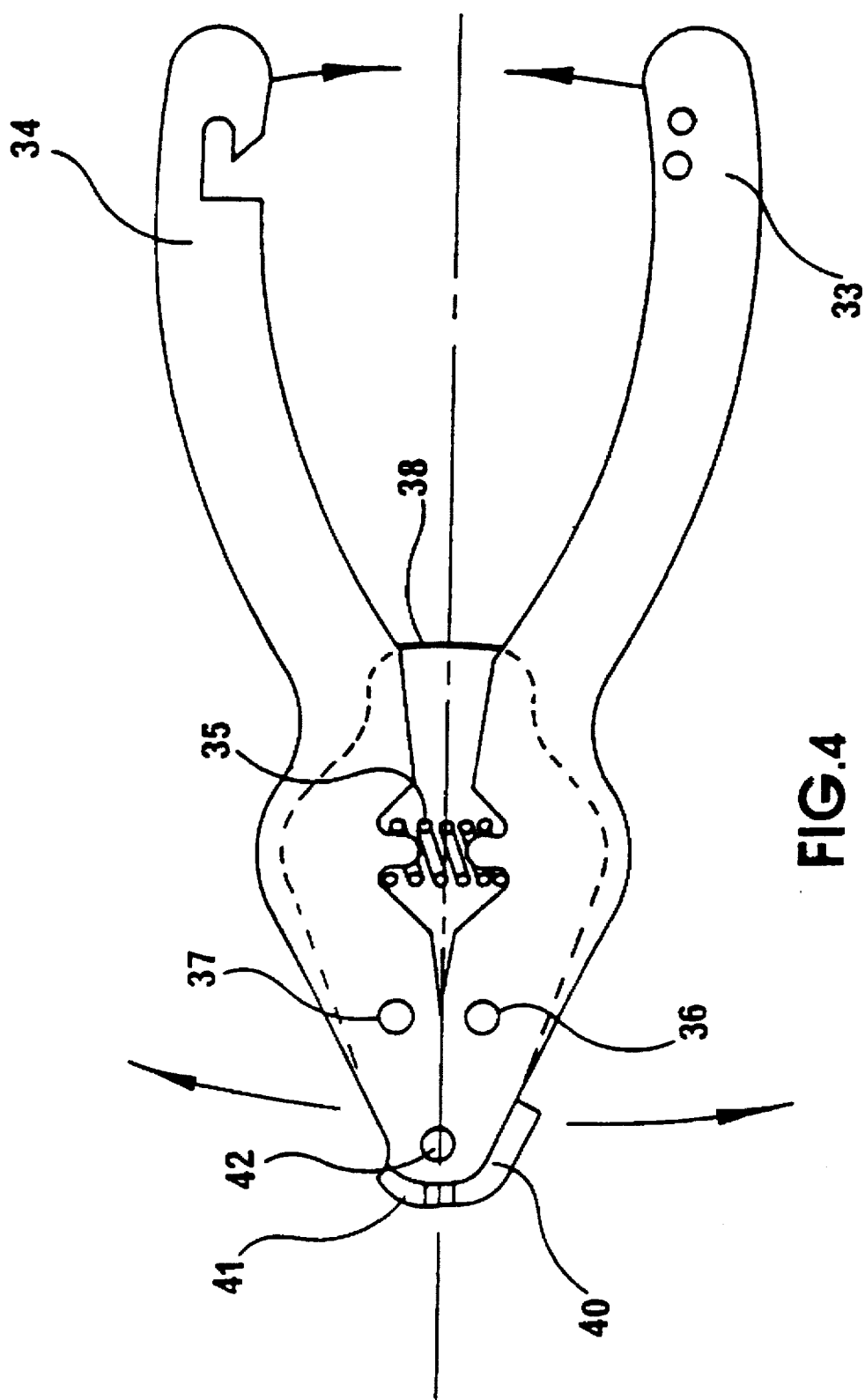
Figure 5:
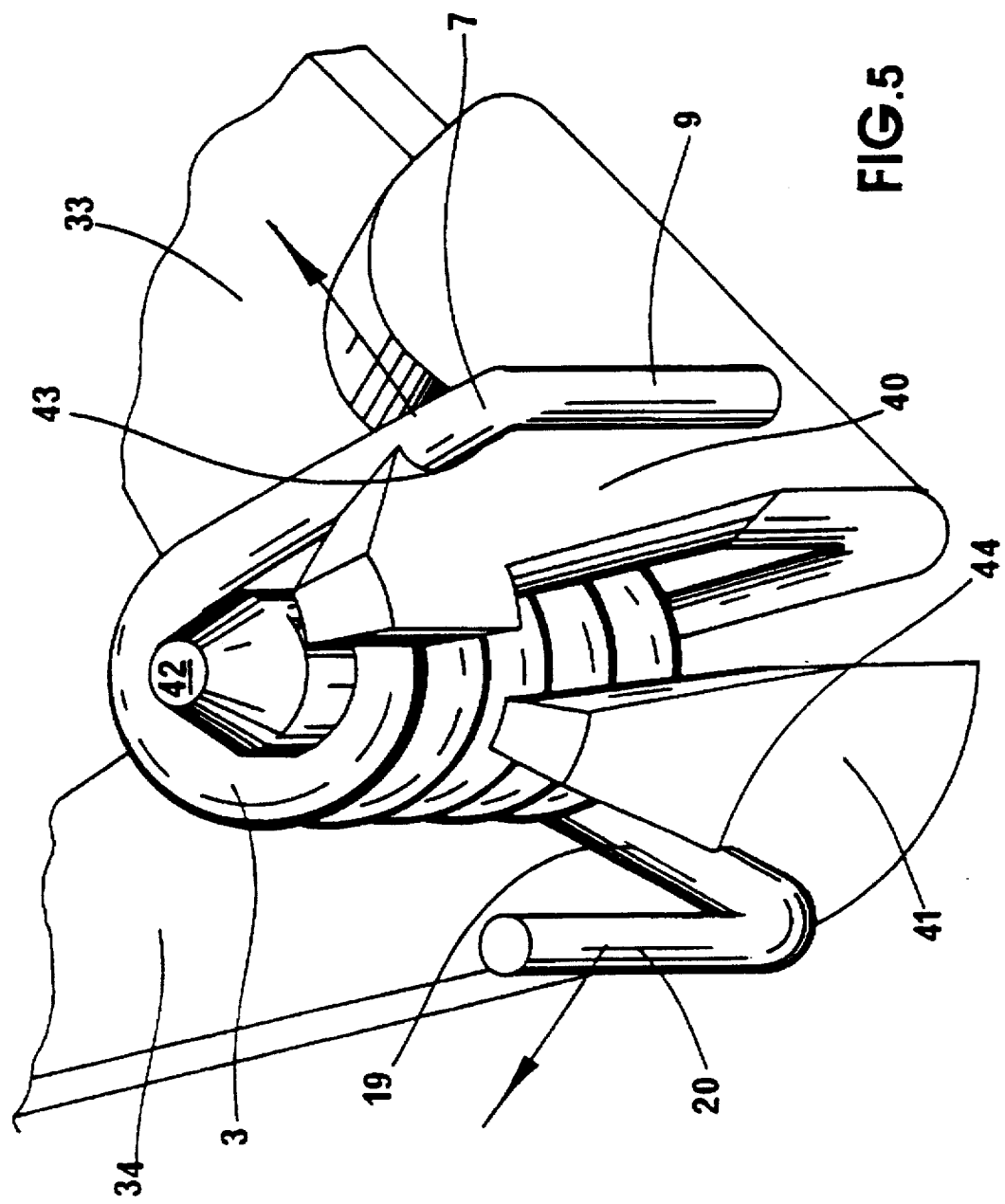
Figures 6, 7:
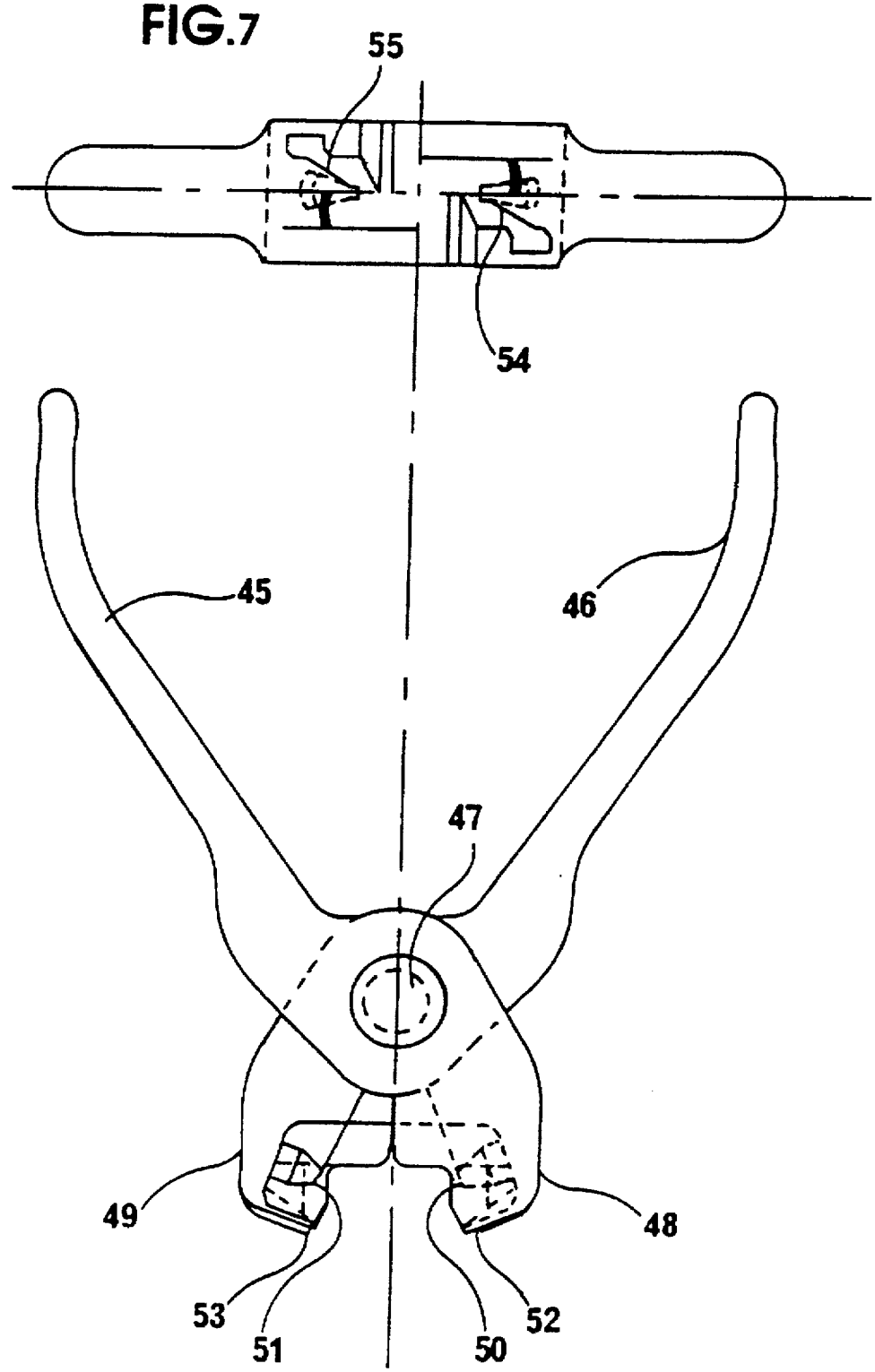

FIG. 3 schematically represents a first embodiment of a pliers for fitting the clamping collar embodying the invention;

FIG. 4 schematically represents a second embodiment of a pliers for fitting the clamping collar embodying the invention;

FIG. 5 is an enlarged view of the two noses of the pliers in FIG. 4 in the position in which they are engaged with the arms of the clamping spring;

FIG. 6 shows a third embodiment of a pliers for fitting the clamping collar embodying the invention;

FIG. 7 shows a front view of the pliers in FIG. 6.

Figure 1:
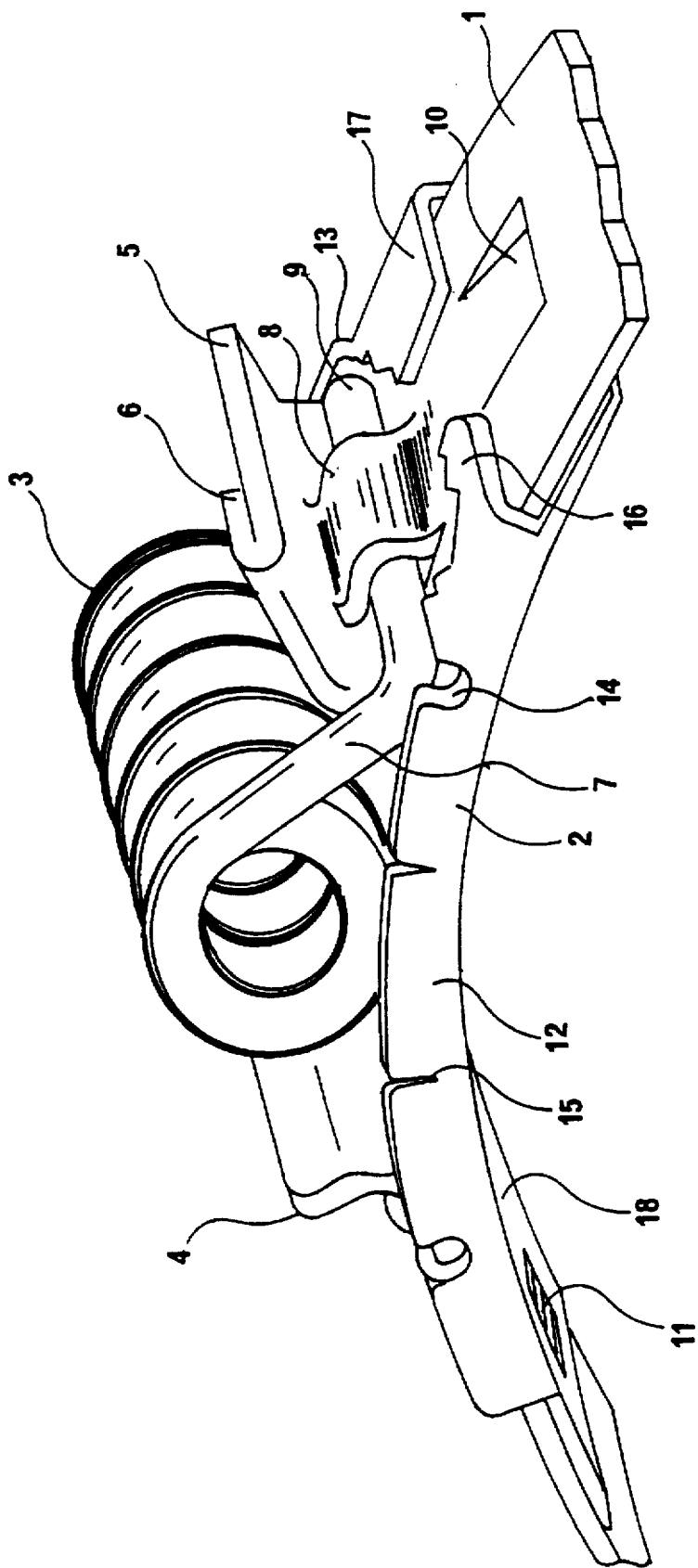
FIG. 1 shows a general perspective view of an example of an embodiment of an elastic type clamping collar according to the invention.

In FIG. 1, the elastic type clamping collar embodying the invention is symbolized by a belt 1, an arcuate screen 2 and a spring 3.

The belt 1 is a metal, plastic, composite or woven (e.g. fiberglass) band. This band is wound into an open loop. At each end it comprises a catching means, arranged perpendicularly to the belt, intended to receive one arm of the spring 3. In the example of an embodiment in FIG. 1, the left end of the belt 1 is a pleat 4, and the right end has a pleat 5 of which one part 6 has been folded outwards to leave room for the arm 7 of the spring 3 to pass, and to enhance the strength of the pleat 5.

Furthermore, the central part 8 of the pleat 5 is cut laterally and raised to constitute an eyelet intended to receive the right-angled end 9 of the arm 7 of the spring 3.

In the vicinity of each end of the band constituting the belt 1, there is provided a tab 10, cut out of the central part of the band and folded back towards the interior of the collar to cooperate with a rack such as 11 provided on the arcuate screen 2, in order to avoid any return motion subsequent to clamping, i.e. an increase of the diameter or expanding of the collar.

The arcuate screen 2 is symmetrical in relation to the plane extending through the axis of the spring 3. It can be metallic or plastic depending on the applications. It is essentially comprised of a bottom 18. In the vicinity of its ends, it bears racks such as 11. It has lateral walls 12, 13 folded upwards to guide the ends of the belt 1 and hold the spring 3. These lateral walls include notches such as 14 or shearings such as 15 to endow the arcuate screen with flexibility and enable it to adapt to the different clamping diameters. In the vicinity of the ends of the arcuate screen 2, the lateral walls are extended by flaps 16, 17 folded back parallel to the bottom 18 in order to assemble the arcuate screen 2, belt 1 and spring 3.

The spring 3 is a helicoid spring, preferably with contiguous convolutions. It is terminated by two arms 7 and 19 (FIG. 2) of which the ends 9 and 20 are folded at right angles and inserted into the catching means provided at the ends of the belt. The ends 9, 20 of the arms extend over practically the entire width of the belt 1. The lateral walls 12 and 13 of the arcuate screen 2 hold the arms 7, 19 and their angled ends 9, 20 in position.

Figure 2:
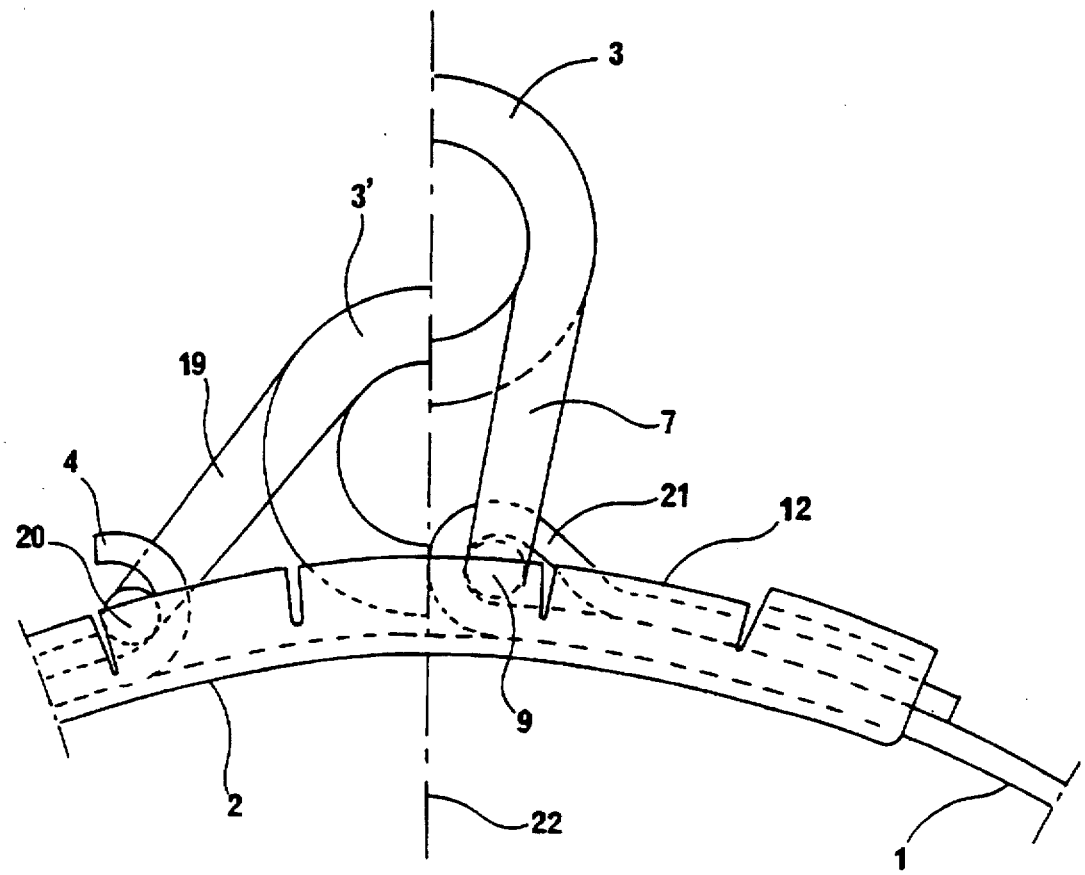
FIG. 2 shows a longitudinal section of the positions of the spring according to another embodiment of the invention, prior to fitting the collar on the right-hand side, and after fitting the clamping collar on the left-hand side.

In the embodiment in FIG. 2, the belt 1 is terminated on the right-hand side by an eyelet 21 obtained by folding back the band constituting the belt 1, and on the left-hand side by a pleat 4.

Prior to being fitted, the collar is as presented on the right-hand side of FIG. 2: the eyelet 21 is practically in the plane of symmetry 22 of the collar, the spring 3 is at rest and its arm 7 is practically vertical, as is the other arm 19 (not represented).

To fit the collar, the latter must be opened by spreading apart the angled ends 9 and 20 of the spring, then by positioning it around the tube to be clamped before releasing the spring 3 for it to symmetrically and elastically clamp the tube.

When the collar is in the clamped position, it takes on the position corresponding to the left-hand side of FIG. 2. The spring 3' is tensed and its arms (19) are positioned at a slant.

In order to spread apart the angled ends 9 and 20 of the arms 7, 19 of the spring 3, the invention uses a pliers to increase the diameter of the spring 3. This pliers is represented schematically in FIG. 3 by the two handles 23, 24 of the hand grip, its axis 25, and the two noses 26, 27. The nose 27 comprises a recess 28, intended to receive the spring 3. The nose 26 bears a finger 29 which protrudes into the nose 27 and recess 28 when the pliers is closed. This finger 29 is held in position by a pin 30.

When the pliers is opened, the spring 3 is inserted into the recess 28. The pliers is then closed and the finger 29 enters the axial space of the spring 3. As the diameter of the finger 29 is greater than the inside diameter of the spring 3, the latter is forced to increase, thereby spreading apart the arms 7 and 19 of the spring and placing them in the slanted position as on the left-hand side of FIG. 2.

During this spring 3 tensioning operation, the right-hand wall 31 of the nose 27 of the pliers constitutes an abutment against which the springs 3 rests.

After fitting the collar on the tube to be clamped, the pliers is open : the left-hand wall 32 of the nose 27 serves as an abutment to retain the spring 3 so as to remove the finger 29 from the spring 3. This left-hand wall 32 comprises an orifice to let the finger 29 pass while retaining the spring 3.

It should be noted that in the embodiment in FIG. 1, the opening of the spring 3 by means of the pliers in FIG. 3 raises the ends of the belt 1 in relation to the arcuate screen 2. As the flaps 16, 17 are folded back parallel to the bottom 18 of the arcuate screen but sufficiently above the belt 1, said belt can be raised to come and abut against the underside of the flaps 16, 17. Preferably, the space between the bottom 18 and the flaps 16, 17 of the arcuate screen 2 is four times the thickness of the belt 1.

When it arrives in abutment against the underside of these flaps 16, 17, the tab 10 is disengaged from the rack 11 borne by the arcuate screen 2: the diameter of the belt can then increase under the action of the spring 3. The collar is subsequently positioned on the tube to be clamped, and then the spring 3 is released from the pliers to ensure symmetrical and elastic clamping of the collar.

The tab 10 again engages with the rack 11 to avoid ill-timed opening of the collar.

The pliers in FIGS. 4 and 5 does not operate according to the principle of the pliers in FIG. 3: it proceeds by direct spreading apart of the arms 7 and 19 of the spring 3.

It comprises two handles 33, 34 spread apart by a spring 35 and susceptible of each pivoting about an axis 36, 37 respectively.

The axes 36, 37 are held in a relatively fixed position by two retaining plates 38, 39 positioned on either side of the handles 33, 34, the plate 39 having been removed for the purposes of clarity of the drawing. Each of the handles 33, 34 is terminated by a nose, respectively 40 and 41. In addition, one of the handles, e.g. 34, bears a finger 42 perpendicular to the mid-plane of the handles 33, 34, and intended to serve as retaining axis for the spring 3 during opening.

The two noses 40, 41 are intended to take up position between the arms 7, 19 of the spring. They each comprise a step 43, 44 respectively to retain the arms of the spring during opening. The pliers opens the clamping spring by exerting pressure on the handles 33, 34, and the spring 35 spreads the handles apart when this pressure ceases to be exerted.

In FIG. 6, the pliers comprises two handles 45, 46 articulated about a common axis 47 and each comprising a jaw 48, 49, respectively.

Each jaw bears a finger 50, 51, respectively, intended to insert itself into the axial space of the spring 3, and a nose 52, 53 having a slanted side intended to cooperate with an arm 7, 19 of the spring 3.

The two slanted sides 54, 55 can be seen in FIG. 7. During opening of the pliers, the two fingers 50, 51 serve as an axial support to retain the spring 3 and the two slanted sides 54, 55 spread the arms 7, 19 of the spring 3 apart from one another.

The collar embodying the invention has several advantages. Firstly, it ensures elastic clamping by way of the action of the spring 3. This clamping is defined by the mechanical property of the spring and the final position of the spring thus corresponds to an ideal tightening. Moreover, when the collar is fitted, it is automatically in the tightened position.

The engaging of the tabs 10 of the belt with the racks 11 on the arcuate screen provide safety in the event of accidental breakage. The lateral walls 12, 13 of the arcuate screen avoid any jumping out of position of the spring which incurs no risk of flying off during fitting.

The pliers which confines the spring when the latter is being put into position is a guarantee of safety for the fitter. The arrangement of the spring 3 with the arms 7, 19 ensures clamping can be viewed. The pliers used to fit the collar is also used for removal thereof, and provides the same safety guarantees. The collar can be reused. By using the pliers to work the collar, there is no need for an electric or pneumatic installation usually indispensable for elastic clamping collars. Furthermore, the collar is of simple structure suitable for different types of materials. Finally, in view of the presence of the spring, a same collar is suited to the clamping of tubes of different diameters. It ensues that the range of collars to be provided is smaller than with collars of the conventional elastic clamping type, which makes its economically more interesting.

Another advantage of the collar embodying the invention is derived from its very simple structure as regards the arcuate screen and the belt. Accordingly, the belt can be approximately twice as thin as a usual type of collar.

I claim:

1. Clamping collar for tubular part, comprising an arcuate screen, a belt and a tightening means, characterized in that:
   the arcuate screen (2) is symmetrical in relation to a diametral plane of the collar,
   the belt (1) is symmetrical in relation to said diametral plane of the collar, and its ends are positioned on the arcuate screen (2),
   the tightening means is substantially symmetrical in relation to said diametral plane of the collar and is connected to the two ends of the belt (1), and
   the tightening is performed symmetrically in relation to said diametral plane of the collar, by drawing the two ends of the belt (1) towards one another by way of the action of the tightening means, so that the points of the arcuate screen (2) and belt (1) situated in said diametral plane of the collar do not have any relative motion in relation to the part to be clamped.

2. The collar as claimed in claim 1, characterized in that the tightening means is a helicoid spring (3) ending in two arms (7, 19) each engaging one end of the belt (1).

3. The collar as claimed in claim 2, characterized in that the belt (1) is an open loop and comprises a catching means at both its ends for the tightening means (3).

4. The collar as claimed in claim 3, characterized in that the catching means on the belt (1) is comprised of pleats (4, 5) in the belt.

5. The collar as claimed in claim 2, characterized in that the arcuate screen (2) has upwardly folded lateral walls (12, 13) for guiding the ends of the belt (1) and for holding the spring (3).

6. The collar as claimed in claim 5, characterized in that the lateral walls (12, 13) of the arcuate screen (2) comprise notches (14, 15) for making the arcuate screen flexible.

7. The collar as claimed in claim 5, characterized in that, in the vicinity of the ends of the arcuate screen (2), the lateral walls (12, 13) comprise flaps (16, 17) folded parallel to the bottom (18) of the arcuate screen and spaced apart from said bottom by a distance of approximately four times the thickness of the belt (1).

8. The collar of claim 2 in combination with a pliers, said pliers comprising a first nose (27) including a recess (28) for receiving the spring (3), and a second nose (26) bearing a finger (29) for insertion, when the pliers is closed, into the axial space of the spring (3) to increase the diameter thereof, thus spreading apart the arms (7, 19) of the spring (3).

9. The collar of claim 8, wherein the first nose (27) including a recess (28) comprises a right-hand wall (31) constituting an abutment against which the spring (3) rests when the pliers is closed, and a left-hand wall (32) constituting an abutment that retains the spring (3) when the pliers is opened.

10. The collar as claimed in claim 4, characterized in that the pleat (5) in the belt (1) comprises an outwardly foldedback part (6) leaving room for the arm (7) of the spring (3) to pass.

11. The collar as claimed in claim 4, characterized in that the central portion (8) of the pleat (5) is cut laterally and raised to form a eyelet for receiving to receive the angled end (9) of the arm (7) of the spring (3).

12. The collar as claimed in claim 1, characterized in that, in the vicinity of its ends, the belt (1) comprises tabs (10) folded towards the interior of the collar.

13. The collar as claimed in claim 12, characterized in that the arcuate screen (2) comprises, in the vicinity of its ends, racks (11) for engaging the tabs (10) of the belt (1).

14. The collar of claim 1 in combination with a pliers, said pliers comprising a finger (42) for insertion into the tightening means (3) and for being a pivotal axis to two noses (40, 41) for spreading apart the tightening means.

15. The collar of claim 1 in combination with a pliers, said pliers comprising two jaws (48, 49) each bearing a finger (50, 51) for insertion into the tightening means and a nose (52, 53) comprising a slanted side (54, 55) for cooperating with the tightening means so that, upon closing the pliers, the two fingers (50, 51) provide axial support to the tightening means and the two slanted sides (54, 55) spread the tightening means apart.

16. A method for fitting a clamping collar on a tubular part, the collar having an arcuate screen, a belt and means for tightening the belt, the method comprising the steps of:
   spreading apart the belt ends by acting on the tightening means so as to increase the diameter of the belt beyond the diameter of the tubular part to be clamped;
   positioning the collar around the tubular part to be clamped, and
   releasing the action on the tightening means in order to let the tightening means bring the belt ends closer together to reduce the diameter of the belt below the diameter of the part to be clamped.

17. The method as claimed in claim 16, wherein the spreading step is carried out by means of a pliers.

18. The method of claim 16, wherein the tightening means comprises a helicoid spring, and wherein the step of spreading the belt ends comprises the step of increasing a diameter of said helicoid spring.

19. A clamping collar for a tubular part comprising:
   an arcuate screen which is substantially symmetrical with respect to a diametral plane of the collar;
   a belt which is substantially symmetrical with respect to the diametral plane of the collar and which has its ends on said arcuate screen; and
   a helicoid spring which is substantially symmetrical with respect to the diametral plane of the collar and which is connected to said belt ends, wherein action of said spring draws said two belt ends together to clamp a tubular part.

20. The collar of claim 19, wherein said spring comprises two arms, each of said two arms for engaging one of said belt ends.

21. The collar of claim 20, wherein at least one of said belt ends comprises an eyelet for receiving one of said arms.

22. The collar of claim 20, wherein at least one of said belt ends comprises a pleat for receiving one of said arms.

23. The clamping collar of claim 19 in combination with a pliers, said pliers comprising nose means for expanding said spring to spread said two ends belt apart.

* * * * *